United States Patent
Lee et al.

(10) Patent No.: US 8,194,226 B2
(45) Date of Patent: Jun. 5, 2012

(54) DEVICE FOR COOLING LCD PANEL AND HEAT TREATMENT APPARATUS HAVING THE SAME

(75) Inventors: Youn-Ho Lee, Cheonan-si (KR);
Min-Young Won, Yongin-si (KR);
Jin-Whal Kim, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 622 days.

(21) Appl. No.: 12/344,809

(22) Filed: Dec. 29, 2008

(65) Prior Publication Data

US 2009/0115956 A1  May 7, 2009

Related U.S. Application Data

(62) Division of application No. 11/232,623, filed on Sep. 22, 2005, now Pat. No. 7,486,375.

(30) Foreign Application Priority Data

Oct. 2, 2004  (KR) .................. 10-2004-0078521

(51) Int. Cl.
    *G02F 1/13* (2006.01)
(52) U.S. Cl. ........................................ 349/187
(58) Field of Classification Search .................. 349/187
    See application file for complete search history.

(56) References Cited

U.S. PATENT DOCUMENTS

| | | | |
|---|---|---|---|
| 5,629,787 A * | 5/1997 | Tsubota et al. ............... 349/153 |
| 6,222,603 B1 | 4/2001 | Sakai |
| 6,459,467 B1 * | 10/2002 | Hashimoto et al. ........... 349/153 |
| 6,700,641 B2 * | 3/2004 | Shiraishi ......................... 355/30 |
| 6,825,447 B2 * | 11/2004 | Kim et al. ....................... 219/390 |
| 7,027,122 B2 | 4/2006 | Lee et al. |
| 7,092,066 B2 | 8/2006 | Matsuda |
| 7,138,629 B2 * | 11/2006 | Noji et al. ...................... 250/311 |
| 7,256,860 B2 | 8/2007 | Lee et al. |
| 2004/0012755 A1 | 1/2004 | Choo et al. |
| 2004/0108075 A1 | 6/2004 | Choo et al. |
| 2004/0257521 A1 | 12/2004 | Murouchi et al. |
| 2010/0237243 A1 * | 9/2010 | Noji et al. ...................... 250/310 |

FOREIGN PATENT DOCUMENTS

| | | |
|---|---|---|
| JP | 07-249859 A | 9/1995 |
| JP | 2000-274952 A | 10/2000 |
| JP | 2002-311438 A | 10/2002 |
| JP | 2003-233052 A | 8/2003 |
| KR | 1020030066127 A | 8/2003 |

\* cited by examiner

*Primary Examiner* — James Dudek
(74) *Attorney, Agent, or Firm* — Cantor Colburn LLP

(57) ABSTRACT

A heat treatment apparatus for manufacturing a liquid crystal display panel through an in-situ process includes a body and a hardening unit, an annealing unit, and a transferring unit disposed on the body. The hardening unit heats a sealing member within a liquid crystal display panel to harden the sealing member. The annealing unit anneals liquid crystal within the liquid crystal display panel sealed by the sealing member. The transferring unit transfers the liquid crystal display panel between the hardening unit and the annealing unit. Therefore, the sealing member may be hardened and the liquid crystal may be sealed through an in-situ process to enhance productivity.

9 Claims, 4 Drawing Sheets

DEVICE FOR COOLING LCD PANEL AND HEAT TREATMENT APPARATUS HAVING THE SAME

CROSS REFERENCE TO RELATED APPLICATIONS

This application is a divisional application of U.S. application Ser. No. 11/232,623 filed Sep. 22, 2005 and issued as U.S. Pat. No. 7,486,375 on Feb. 3, 2009, which claims priority to Korean Patent Application No. 2004-78521, filed on Oct. 2, 2004 and all the benefits accruing therefrom under 35 U.S.C. §119, and the contents of which in their entirety are herein incorporated by reference.

BACKGROUND OF THE INVENTION

1. Field of the Invention

The present invention relates to a device for cooling a liquid crystal display ("LCD") panel, and a heat treatment apparatus having the device for cooling an LCD panel. More particularly, the present invention relates to a device for cooling an LCD panel, which is capable of cooling an LCD panel through an in-situ process to enhance productivity, and a heat treatment apparatus having the device for cooling an LCD panel.

2. Description of the Related Art

Generally, a display apparatus converts electric signals processed by an information processing apparatus into an image. Examples of display apparatus include a cathode ray tube ("CRT") display apparatus, an LCD apparatus, an organic light emitting display ("OLED") apparatus, a plasma display panel ("PDP"), etc.

The LCD apparatus includes an LCD panel having two substrates and a liquid crystal layer interposed between the two substrates. The LCD apparatus displays an image by changing an arrangement of liquid crystal molecules of the liquid crystal layer.

A sealing member combines the two substrates of the LCD panel. The sealing member is hardened by heat or light applied thereto. Then, the sealing member is cooled. The liquid crystal is heated, so that the liquid crystal is distributed uniformly between the two substrates, and the liquid crystal is also cooled. Therefore, a device for cooling the LCD panel is used for manufacturing the LCD apparatus.

However a conventional device for cooling an LCD panel requires a significant amount of time thus lowering productivity.

BRIEF SUMMARY OF THE INVENTION

The present invention provides a device for cooling an LCD panel, which is capable of cooling an LCD panel through an in-situ process to enhance productivity.

The present invention also provides a heat treatment apparatus having the device for cooling an LCD panel.

In exemplary embodiments of a device for cooling an LCD panel, the cooling device includes a chamber, a receiving unit, and a cooling module. The receiving unit is disposed in the chamber. The receiving unit receives a plurality of LCD panels such that a virtual line penetrating centers of the LCD panels is substantially perpendicular to a bottom surface face of the chamber. The cooling module provides the chamber with cooling fluid having a lower temperature than a room temperature.

The cooling device may further comprise a blowing fan disposed in the chamber, the blowing fan blowing the cooling fluid directly toward the LCD panels.

The cooling device may further comprise a circulating fan disposed in the chamber, the circulating fan circulating the cooling fluid in the chamber.

In exemplary embodiments of a heat treatment apparatus, the heat treatment apparatus includes a body, a hardening unit, an annealing unit, and a transferring unit. The hardening unit is disposed on the body. The hardening unit heats a sealing member to harden the sealing member. The annealing unit is disposed on the body. The annealing unit anneals liquid crystal sealed by the sealing member. The transferring unit transfers the LCD panel between the hardening unit and the annealing unit.

The transferring unit may be disposed between the hardening unit and the annealing unit.

The heat treatment apparatus may further comprise a loader and an unloader disposed on the body for loading the LCD panel and for receiving the LCD panel, respectively.

The heat treatment apparatus may further comprise a cooling unit that cools the LCD panel that is processed by at least one of the hardening unit and the annealing unit.

The cooling unit may be disposed at an exit of the hardening unit.

The cooling unit may be disposed at an exit of the annealing unit.

The cooling unit may include a cooling chamber and a cooling module. The cooling chamber receives the LCD panel, the cooling module provides the cooling chamber with cooling fluid, and a first fan blows the cooling fluid directly toward the LCD panel.

The cooling unit may further comprise a second fan that circulates the cooling fluid in the cooling chamber.

The hardening unit, the annealing unit, and the transferring unit may be integrally formed with the body.

Thus, the heat treatment apparatus of the embodiments described herein heats the LCD panels, to harden the sealing member and to anneal the liquid crystal, and cools the LCD panels in-situ process. Therefore, productivity is enhanced.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
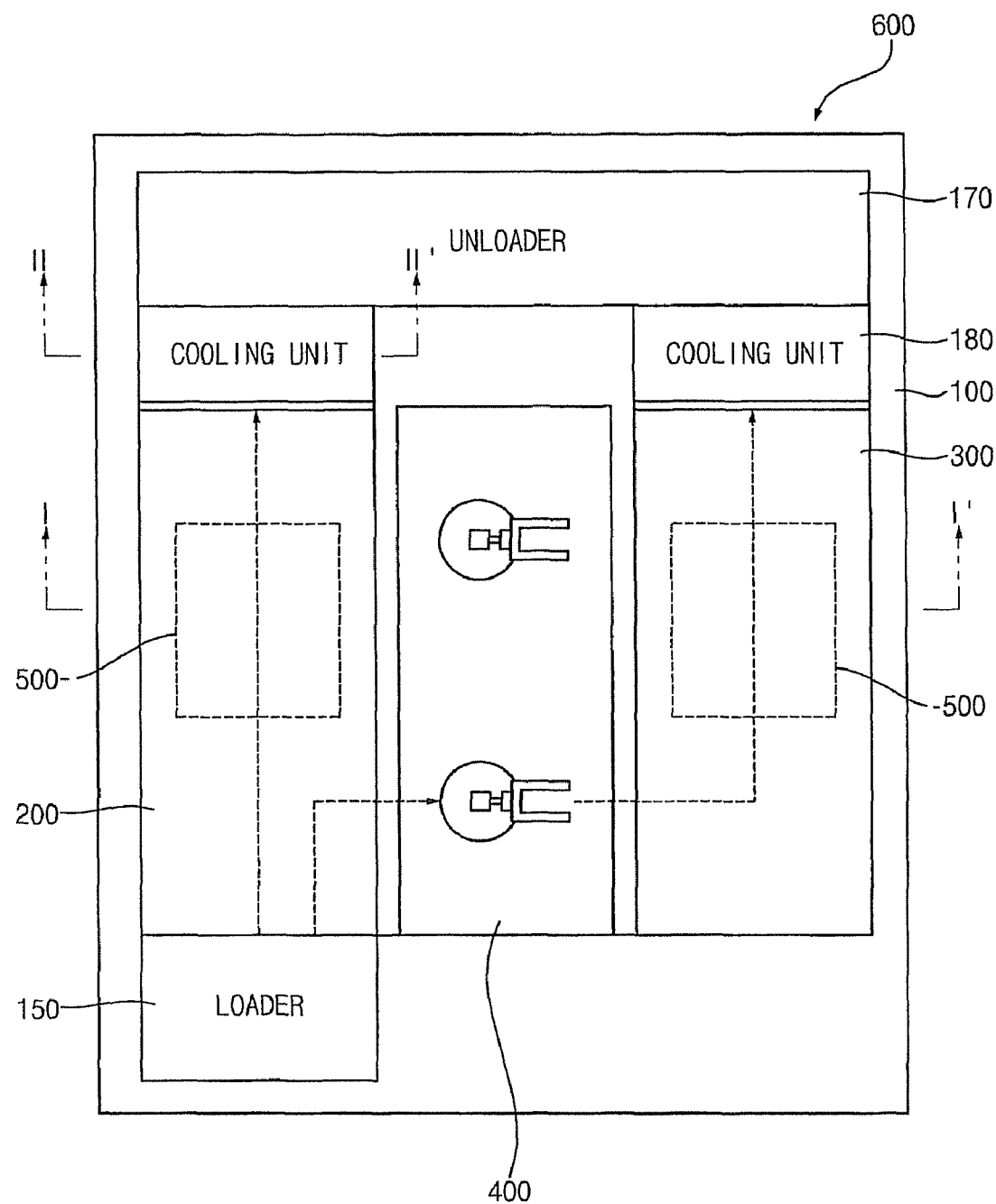
FIG. 1 is a conceptual view illustrating an exemplary embodiment of a heat treatment apparatus for manufacturing an LCD panel according to the present invention.

Hereinafter, the embodiments of the present invention will be described in detail with reference to the accompanied drawings. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

FIG. 1 is a conceptual view illustrating an exemplary embodiment of a heat treatment apparatus for manufacturing an LCD panel.

A heat treatment apparatus 600 for manufacturing an LCD panel through an in-situ process includes a body 100, a hardening unit 200, an annealing unit 300, and a transferring unit 400. The heat treatment apparatus 600 enables an LCD panel to pass through operations including hardening, annealing, and cooling, all within the same heat treatment apparatus 600. Thus, the manufacturing time of an LCD panel using the heat treatment apparatus 600 is reduced compared to other methods of manufacturing an LCD panel.

The body 100 supports, in part, the hardening unit 200 and the annealing unit 300.

Figure 2:
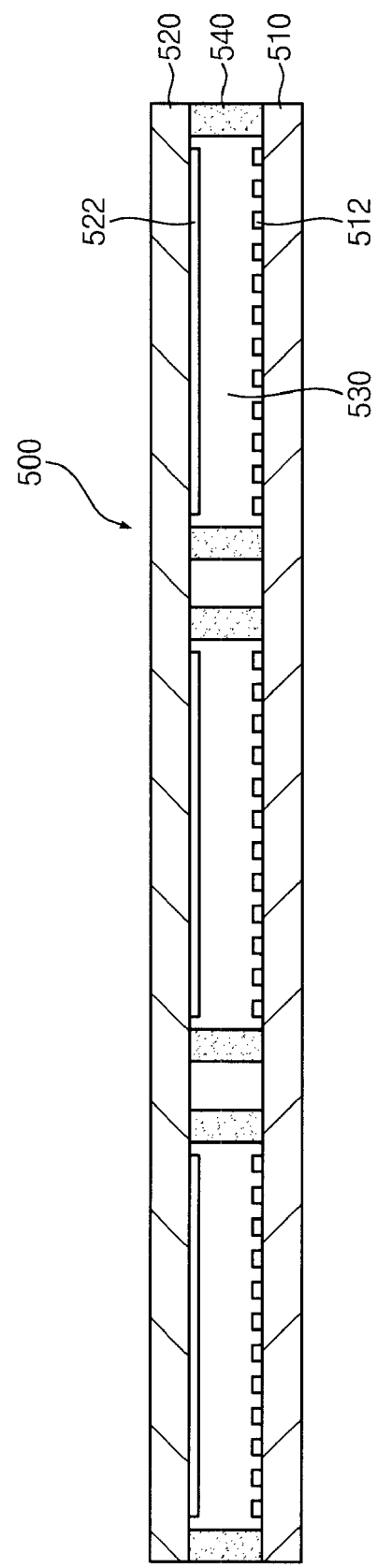
FIG. 2 is a cross-sectional view illustrating a liquid crystal display panel processed by the heat treatment apparatus in FIG. 1.

FIG. 2 is a cross-sectional view illustrating a liquid crystal display panel processed by the heat treatment apparatus in FIG. 1.

A liquid crystal display ("LCD") panel 500 processed by the heat treatment apparatus 600 includes a first substrate 510, a second substrate 520, liquid crystal 530, and a sealing member 540.

When an electrical image signal is applied to a display unit incorporating the LCD panel 500, the display unit may control a light transmittance of a liquid crystal layer included in the LCD panel 500. Thus, the display unit may display an image. A backlight assembly provides the display unit with light.

Such a display unit includes the illustrated LCD panel 500 and also may include a data printed circuit board ("PCB"), a gate PCB, a data tape carrier package ("TCP"), and a gate TCP, not shown. The LCD panel 500 displays an image by using rearrangements of liquid crystal molecules in the liquid crystal layer of the LCD panel 500.

The first substrate 510 includes a transparent substrate having high optical transmittance. The transparent substrate may employ, for example, a glass substrate. The first substrate 510 includes a plurality of pixel electrodes 512 arranged in a matrix shape on the transparent substrate. The pixel electrodes 512 include an optically transparent and electrically conductive material, for example, indium tin oxide ("ITO"), indium zinc oxide ("IZO"), etc. An ITO layer or an IZO layer is formed on the transparent substrate and patterned to form the pixel electrodes 512.

The first substrate 510 may further include a thin film transistor ("TFT", not shown) through which a pixel voltage is applied to the pixel electrodes 512, and wirings electrically connected to the TFT.

The second substrate 520 faces the first substrate 510. The second substrate 520 includes a transparent substrate having high optical transmittance. The transparent substrate may employ, for example, a glass substrate.

The second substrate 520 includes a common electrode 522 such that the common electrode 522 faces the pixel electrodes 512. The common electrode 522 includes an optically transparent and electrically conductive material, for example, ITO, IZO, etc.

The second substrate 520 may further include color filters facing the pixel electrodes 512. Color pixels in a color filter substrate may include a red pixel, a green pixel, and a blue pixel. A red ray of a light incident on the red pixel selectively passes through the red pixel. A green ray of a light incident on the green pixel selectively passes through the green pixel. A blue ray of a light incident on the blue pixel selectively passes through the blue pixel. A black matrix layer may be formed between the color pixels by a thin film process. The black matrix layer increases a contrast of a light irradiated from the color pixels. The common electrode may be formed on a front face of the color filter substrate.

The data and gate PCBs (not shown) provide the LCD panel 500 with drive signals and timing signals, respectively. The data TCP (not shown) electrically connects the data PCB to a data line included in the TFT of the LCD panel 500. The gate TCP (not shown) electrically connects the gate PCB to a gate line included in the TFT of the LCD panel 500. The driving signals provided by the data PCBs are used for driving the display unit, and the timing signals provided by the gate PCBs are used for driving the display unit at a desired timing.

The sealing member 540 is disposed between the first and second substrates 510 and 520. The sealing member 540 combines the first substrate 510 with the second substrate 520, and confines liquid crystal 530 between the first and second substrates 510 and 520.

The sealing member 540 includes a material that is hardened by heat or light. In particular, the sealing member 540 may include a material that is hardened when ultraviolet light is irradiated onto the material, such as a UV curable sealant. When UV rays are emitted from a light supply unit and irradiated onto the LCD panel 500, the sealing member formed from a UV curable sealant is hardened. Alternatively, the sealing member 540 may include a material that is hardened when the material is heated, such as a thermal hardening resin.

In the embodiment described herein, the sealing member 540 includes a material that is hardened when the material is heated, such as, but not limited to, a thermal hardening resin. Other sealing members are also within the scope of these embodiments.

In one exemplary embodiment, the sealing member 540, having a band shape, is formed along edges of either the first and second substrates 510, 520. The liquid crystal may then be dropped into the display area surrounded by the sealing member 540, and then the first substrate 510 is assembled with the second substrate 520. Alternatively, the liquid crystal 530 may be injected between the first and second substrates 510, 520 after the first and second substrates are assembled with each other using the sealing member 540.

Thus, the liquid crystal 530 is confined in a space defined between the first and second substrates 510 and 520. Liquid crystal molecules of the liquid crystal 530 are rearranged when electric fields are applied to the liquid crystal 530 to change optical transmittance. The liquid crystal 530 may vary an arrangement thereof in accordance with an electric field between the pixel and common electrodes. Therefore, an image is displayed.

In the illustrated embodiment, the liquid crystal 530 is dropped onto the first substrate 510 having the sealing member 540 formed thereon, however other methods of assembling the first and second substrates 510, 520 with the sealing member 540 are within the scope of these embodiments.

Figure 3:
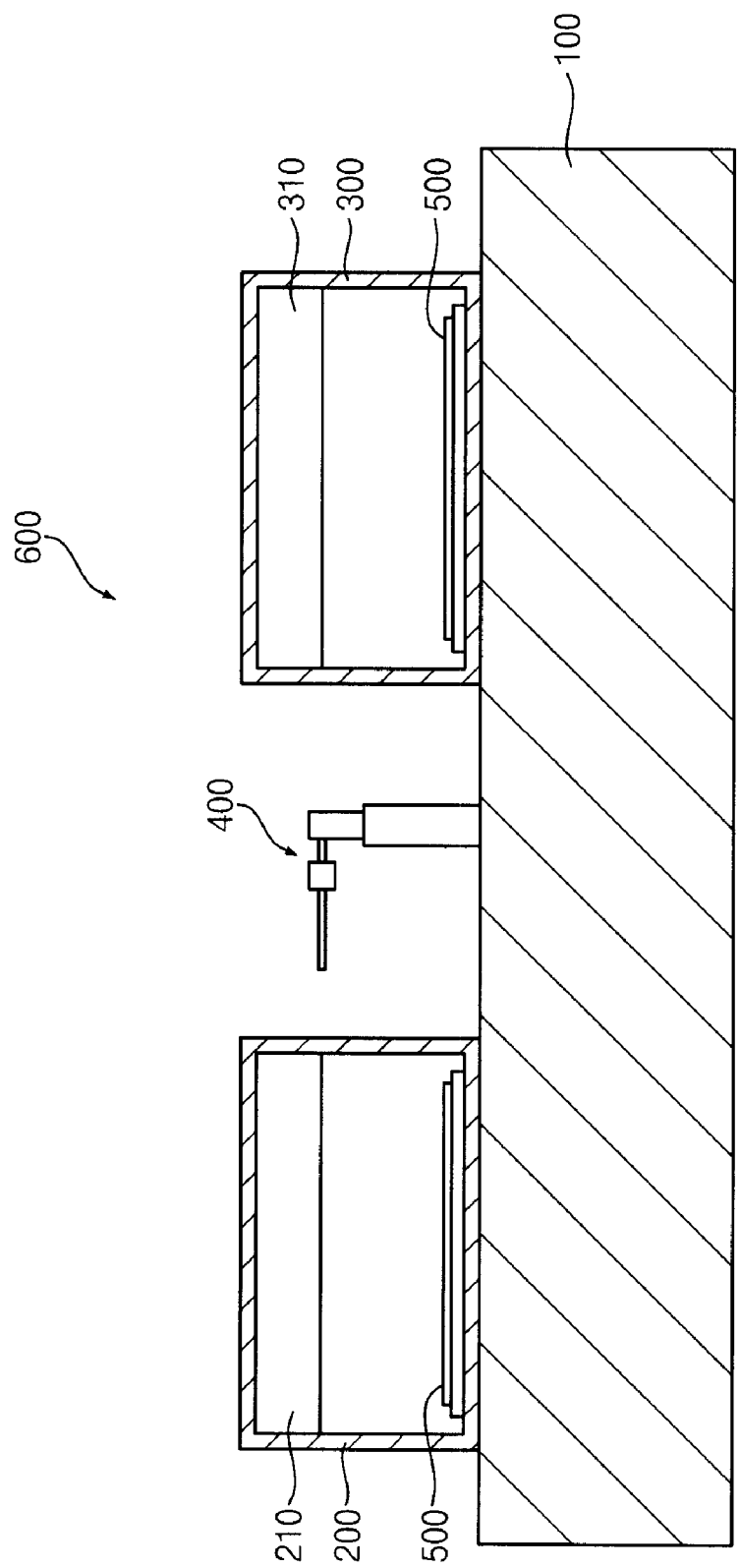
FIG. 3 is a schematic cross-sectional view taken along line I-I' in FIG. 1.

FIG. 3 is a schematic cross-sectional view taken along line I-I' in FIG. 1.

Referring to FIGS. 1 to 3, the hardening unit 200 is disposed on the body 100. The hardening unit 200 disposed on the body 100 hardens the sealing member 540. In the illustrated embodiment, the sealing member 540 is hardened by heat, however other hardening methods, such as UV curing, are within the scope of these embodiments. Therefore, the sealing member 540 combines the first and second substrates 510 and 520.

The hardening unit 200 has, for example, a box-shape having an entrance through which the LCD panel 500 is provided to the hardening unit 200, and an exit through which the LCD panel 500 is discharged from the hardening unit 200.

The hardening unit 200 includes a heating unit 210 that heats the sealing member 540. The heating unit 210 may alternatively be an optical unit that irradiates ultraviolet light when the sealing member 540 alternatively includes material that is hardened by ultraviolet light. The LCD panel 500 is seated within the hardening unit 200 within a space between the heating unit 210 and the body 100.

The hardening unit 200 may be separately formed from the body 100. Alternatively, the hardening unit 200 may be integrally formed with the body 100. The annealing unit 300 is disposed on the body 100. The annealing unit 300 spreads the liquid crystal 530 throughout the space defined between the first and second substrates 510 and 520 to prevent the generation of voids within the space. The LCD panel 500 is seated within the annealing unit 300 within a space between the heating unit 310 and the body 100.

In particular, the annealing unit 300 heats the liquid crystal 530 in order to prevent such voids.

The annealing unit 300 has, for example, a box-shape having an entrance through which the LCD panel 500 is provided to the annealing unit 300, and an exit through which the LCD panel 500 is discharged from the annealing unit 300.

The annealing unit 300 includes a heating unit 310 that heats the liquid crystal 530. The annealing unit 300 may be separately formed from the body 100. Alternatively, the annealing unit 300 may be integrally formed with the body 100. In addition to preventing voids from occurring within the liquid crystal 530, annealing is a process by which a material is heated, such as the liquid crystal 530, to change its crystalline structure in order to toughen and reduce brittleness of the liquid crystal 530.

The annealing unit 300 anneals the LCD panel 500 that is discharged from the hardening unit 200. Therefore, the annealing unit 300 is disposed, preferably adjacent to the hardening unit 200. For example, the annealing unit 300 and the hardening unit 200 are disposed substantially parallel with each other. The entrances of the hardening unit 200 and the annealing unit 300 turn toward same direction, and the exits of the hardening unit 200 and the annealing unit 300 turn toward same direction. Also, an exit of the hardening unit 200 faces an entrance of the annealing unit 300.

The transferring unit 400 transfers the LCD panel 500 from the hardening unit 200 to the annealing unit 300. The transferring unit 400 may be integrally formed with the body 100. The transferring unit 400 may be disposed on the body 100. Alternatively, the transferring unit 400 may be disposed adjacent to the body 100.

As shown in the illustrated embodiment, the transferring unit 400 is disposed on the body 100, and between the hardening unit 200 and the annealing unit 300.

The transferring unit 400 may include a number of robotic mechanisms each having at least one robotic arm. A number of robotic mechanisms or robotic arms may be changed according to an amount of LCD panels 500 processed at the same time. Other transferring units may include conveyors, robots, stockers, automatic guided vehicles, etc., although the transferring unit 400 of this embodiment is positioned on the body 100 and between the hardening unit 200 and the annealing unit 300.

The heat treatment apparatus 600 may further include a loader 150 for receiving the LCD panel 500 that is to be hardened and/or annealed, and an unloader 170 for receiving the LCD panel 500 that has undergone a hardening and/or annealing process. The loader 150 and the unloader 170 may be formed on the body 100.

According to the present embodiment, the loader 150 is disposed on the body 100 such that the loader 150 faces the entrances of the hardening unit 200 and the annealing unit 300. Alternatively, two loaders 150 may be disposed at the entrances of the hardening unit 200 and the annealing unit 300, respectively. The hardening unit 200 may include an entrance facing the loader 150. The annealing unit 300 may include an entrance facing the hardening unit 200 for receiving LCD panels 500 from the transferring unit 400. The annealing unit 300 may also include an additional entrance facing a second loader 150 arranged generally parallel to the first loader 150.

The unloader 170 is disposed on the body 100 such that the unloader 170 faces the exits of the hardening unit 200 and the annealing unit 300. The annealing unit 300 may include an exit facing the unloader 170. The hardening unit 200 may include an exit facing the annealing unit 300 for transferring LCD panels 500 from the hardening unit 200 to the annealing unit 300 via the transferring unit 400. The hardening unit 200 may also include an additional exit facing the unloader 170. Alternatively, two unloaders 170 may be disposed at the exits of the hardening unit 200 and the annealing unit 300, respectively.

In operation, the LCD panels 500 may be loaded via the loader 150 to the hardening unit 200, or directly to the annealing unit 300. LCD panels loaded to the hardening unit 200 may undergo a hardening process and then be passed to the annealing unit 300 by the transferring unit 400. Alternatively, LCD panels 500 loaded to the hardening unit 200 may undergo a hardening process and then be unloaded via the unloader 170. LCD panels 500 received by the transferring unit 400 from the hardening unit 200 into the annealing unit 300 may undergo an annealing process before being unloaded via the unloader 170. Also, LCD panels 500 loaded directly to the annealing unit 300 may undergo an annealing process before being unloaded via the unloader 170. Thus, a variety of processing options may be performed by the heat treatment apparatus 600.

Figure 4:
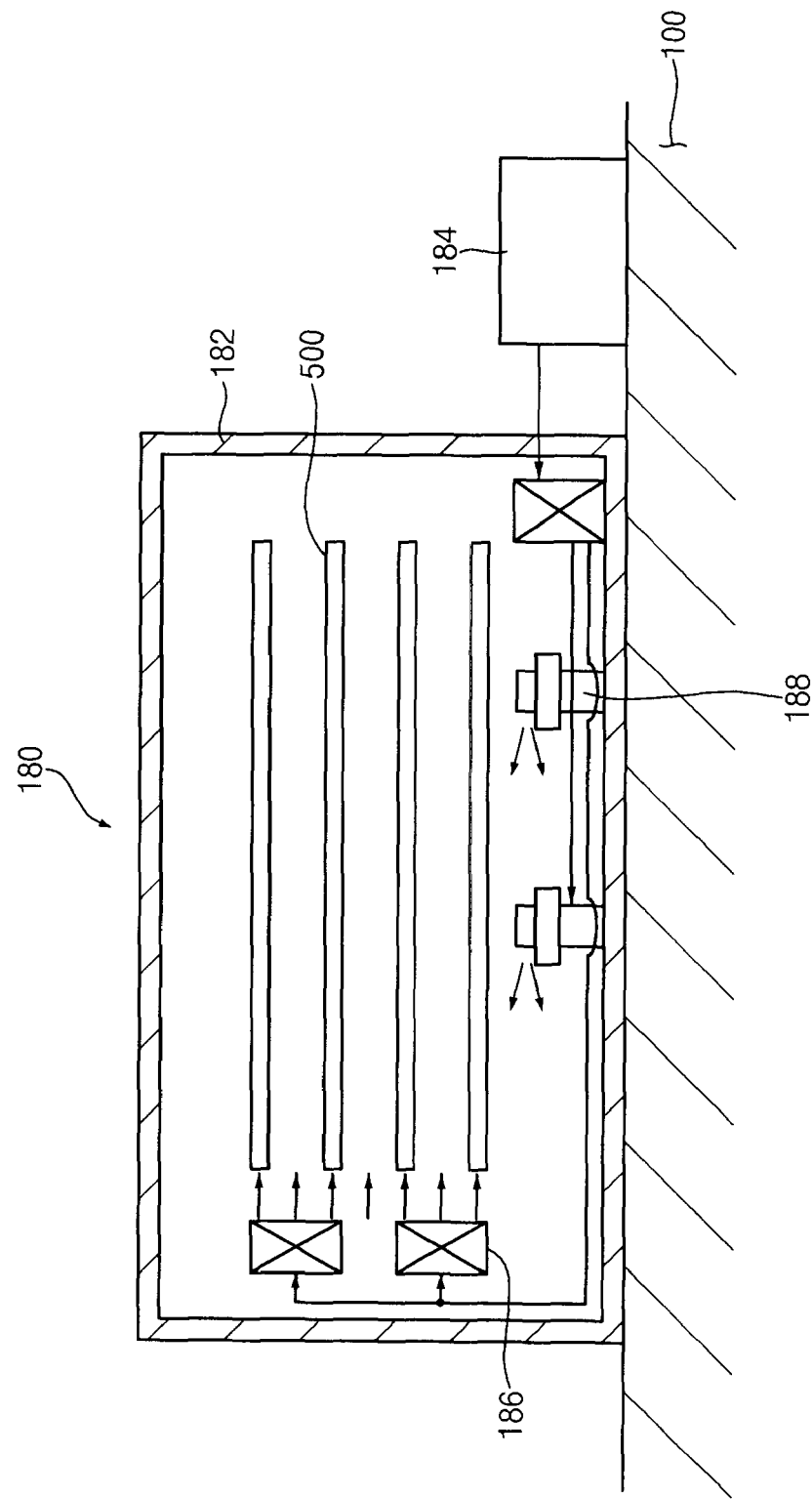
FIG. 4 is a schematic cross-sectional view taken along line II-II' in FIG. 1.

FIG. 4 is a schematic cross-sectional view taken along line II-II' in FIG. 1.

Referring to FIG. 4, the heat treatment apparatus 600 may further include a cooling unit 180.

The cooling unit 180 may be disposed at the exit of the hardening unit 200 facing the unloader 170. Alternatively, the cooling unit 180 may be disposed at exits of the hardening unit 200 and the annealing unit 300 facing the unloader 170.

The cooling unit 180 cools the LCD panel 500 heated by the hardening unit 200 and/or the annealing unit 300 in an abbreviated time period.

The cooling unit 180 cools the LCD panel 500 to room temperature, and minimizes defects that may otherwise happen during cooling of the LCD panels 500.

The cooling unit 180 includes a cooling chamber 182 and a cooling module 184. The cooling chamber 182 includes an entrance facing exits of the hardening unit 200 and the annealing unit 300 for receiving one or more LCD panels 500 therein. The cooling chamber 182 also includes an exit facing the unloader 170 for unloading the LCD panels 500 from the cooling unit 180.

The cooling chamber 182 rapidly cools the LCD panel 500 heated by the hardening unit 200 and/or the annealing unit 300. The cooling chamber 182 contains cooling fluid having a temperature lower than a room temperature.

The cooling chamber 182 may be sized to receive at least two LCD panels 500, and may be sized to receive any number of LCD panels 500 in a stacked condition. Although sized to receive a plurality of LCD panels 500, the cooling chamber 182 may also receive less than its maximum capacity of LCD panels 500. When the LCD panels 500 are stacked inside the cooling chamber 182, the LCD panels 500 are disposed such that the LCD panels 500 are spaced apart from each other. In particular, a receiving unit disposed in the cooling chamber 182 receives a plurality of LCD panels 500 such that a virtual (imaginary) line penetrating centers of the LCD panels 500 is substantially perpendicular to a bottom surface of the chamber 182. In other words, the LCD panels 500 received within the cooling chamber 182 lie substantially parallel to each other and to a bottom surface of the chamber 182. Furthermore, because the cooling chamber 182 receives the LCD panels 500 in a stacked condition, a first LCD panel 500 may be closer to a bottom surface of the chamber 182 than a second LCD panel 500, while a third LCD panel 500 may be further from the bottom surface of the chamber 182 than the second LCD panel 500, etc.

The cooling module 184 provides the cooling chamber 182 with the cooling fluid. For example, the cooling fluid may be air having a lower temperature than a room temperature. Other cooling fluids supplied by the cooling module 184 to the cooling chamber 182 are also within the scope of these embodiments.

The cooling fluid in the cooling chamber 182 rapidly cools the LCD panel or panels 500.

The cooling unit 180 may further include first and second cooling fans 186 and 188. The first and second cooling fans 186 and 188 are disposed within the cooling chamber 182. Alternatively, bodies of the first and second cooling fans 186, 188 may be positioned on an exterior of the cooling chamber 182 while their direction of air flow may be pointed towards an interior of the cooling chamber 182.

The first cooling fan 186 may include one or more cooling fans 186, depending on the size of the cooling chamber 182. Each first cooling fan 186 may be disposed at a side of the cooling chamber 182. The first cooling fan 186 blows the cooling fluid directly to the LCD panels 500. In detail, the first cooling fan 186 may blow air between the LCD panels 500.

The second cooling fan 188 may include one or more cooling fans 188, depending on the size of the cooling chamber 182. Each second cooling fan 188 may be disposed at a bottom of the cooling chamber 182. The second cooling fan 188 circulates the cooling fluid in the cooling chamber 182. The direction of flow created by the second cooling fan 188 may be opposite a direction of flow created by the first cooling fan 186. Also, the direction of flow created by the second cooling fan 188 may be in the same direction as a direction of flow of cooling fluid supplied by the cooling module 184.

According to the cooling unit 180, the first cooling fan 186 blows the cooling fluids being circulated by the second cooling fan 188 directly to the LCD panels 500. Therefore, the LCD panels 500 are cooled rapidly and uniformly.

According to the embodiments described herein, the heat treatment apparatus heats the LCD panels to harden the sealing member and to anneal the liquid crystal, and cools the LCD panels in-situ process, that is, all within the same heat treatment apparatus. Therefore, productivity is enhanced.

Having described the exemplary embodiments of the present invention and its advantages, it is noted that various changes, substitutions and alterations can be made herein without departing from the spirit and scope of the invention as defined by appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A device for cooling a display panel, comprising:
a chamber in which a plurality of display panels are cooled;
a receiving unit in the chamber, the receiving unit receiving the plurality of display panels, wherein a virtual line penetrating centers of the display panels is substantially perpendicular to a bottom surface face of the chamber; and
a cooling module that provides the chamber with cooling fluid having a lower temperature than a room temperature which cools the display panels.

2. The device of claim 1, wherein the receiving unit receives the plurality of display panels in a stacked condition with each display panel arranged substantially parallel to the bottom surface face of the chamber.

3. The device of claim 1, further comprising a blowing fan, wherein the blowing fan is arranged for blowing the cooling fluid directly towards the display panels.

4. The device of claim 3, wherein the blowing fan is disposed within the chamber and on a sidewall of the chamber.

5. The device of claim 3, wherein the blowing fan blows the cooling fluid in a direction opposite a direction that the cooling fluid is provided by the cooling module.

6. The device of claim 1, further comprising a circulating fan, wherein the circulating fan is arranged for circulating the cooling fluid in the chamber.

7. The device of claim 6, wherein the circulating fan is disposed within the chamber and on the bottom surface face of the chamber.

8. The device of claim 6, wherein the circulating fan is placed adjacent to an entrance of the cooling fluid from the cooling module to the chamber, and the circulating fan blows the cooling fluid in a same direction as a direction of the cooling fluid at the entrance.

9. The device of claim 1, further comprising at least one blowing fan that blows the cooling fluid directly towards the display panels, and at least one circulating fan that circulates the cooling fluid within the chamber.

* * * * *